US012750086B2

(12) United States Patent
Celedon et al.

(10) Patent No.: US 12,750,086 B2
(45) **Date of Patent: *Sep. 29, 2026**

(54) SYSTEMS AND METHODS FOR LOW DATA RATE, LOW POWER BI-DIRECTIONAL TRANSMISSIONS OVER EXISTING PHYSICAL COMMUNICATION MEDIA

(71) Applicant: Applied Optoelectronics, Inc., Sugar Land, TX (US)

(72) Inventors: Rafael Celedon, Atlanta, GA (US); Yi Wang, Katy, TX (US); Tina Mathews, Richmond, TX (US); Ruru Chen, Missouri City, TX (US); Mark Siejka, Winder, GA (US); Hang Xie, Missouri City, TX (US); Ramesh Nallur, Duluth, GA (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 103 days.

This patent is subject to a terminal disclaimer.

(21) Appl. No.: 18/437,594

(22) Filed: Feb. 9, 2024

(65) Prior Publication Data

US 2024/0275426 A1 Aug. 15, 2024

Related U.S. Application Data

(60) Provisional application No. 63/444,797, filed on Feb. 10, 2023.

(51) Int. Cl.
*H04B 1/69* (2011.01)
*H04B 10/25* (2013.01)
(Continued)

(52) U.S. Cl.
CPC ......... *H04B 1/69* (2013.01); *H04B 10/25751* (2013.01); *H04B 10/2589* (2020.05); *H04L 12/2801* (2013.01); *H04B 2001/6912* (2013.01)

(58) Field of Classification Search
CPC ................ H04B 1/69; H04B 10/25751; H04B 10/2589; H04B 2001/6912;
(Continued)

(56) References Cited

U.S. PATENT DOCUMENTS 9,647,718 B2 5/2017 Seller
2004/0022304 A1 2/2004 Santhoff et al.
(Continued)

FOREIGN PATENT DOCUMENTS

AU 2020102711 A4 * 12/2020 ........... H04W 88/16

OTHER PUBLICATIONS

Sánchez et al. "Remote Monitoring of RF Amplifiers in HFC Networks: Voltage Drop Detection due to Power Blackouts," 2022 Congreso Internacional de Innovación y Tendencias en Ingeniería (CONIITI), Bogota, Colombia, 2022, pp. 1-6 (Year: 2022).*
(Continued)

*Primary Examiner* — Sam K Ahn
*Assistant Examiner* — Amneet Singh
(74) *Attorney, Agent, or Firm* — Secant IP, P.L.L.C.

(57) ABSTRACT

Low data rate, low power, bi-directional transmissions may be provided over existing physical communication media (e.g., coaxial cables and/or optical fiber) and in the presence of higher bandwidth, higher power primary signals currently being transmitted over the communication media. The low data rate, low power, bi-directional transmissions may be accomplished using spread-spectrum modulated signals that are positioned in frequency relative to the primary signals, such that the low data rate, low power transmissions occur without detectable interference with the primary signals, which include multiplexed narrowband modulated signals. In some embodiments, the primary signals may be modulated using quadrature amplitude modulation (QAM) and multiplexed using orthogonal frequency division multiplex-
(Continued)

ing (OFDM) and the spread-spectrum modulated signals may be chirp spread spectrum (CSS) modulated signals modulated using Gaussian frequency shift keying (GFSK). One example of the spread-spectrum modulated signals is implemented using LoRa technology and communication protocols defined by the LoRaWAN standard.

21 Claims, 12 Drawing Sheets

(51) Int. Cl.
*H04B 10/2575* (2013.01)
*H04L 12/28* (2006.01)

(58) Field of Classification Search
CPC .... H04L 12/2801; H04N 7/10; H04N 7/0806; H04N 7/173; H04N 7/22; H04N 7/24
See application file for complete search history.

(56) References Cited

U.S. PATENT DOCUMENTS

2009/0271836 A1 10/2009 Maxson et al.
2010/0316372 A1* 12/2010 Chang ................ H04B 10/0771 398/12
2013/0279914 A1* 10/2013 Brooks .............. H04Q 11/0067 398/43
2015/0172072 A1* 6/2015 Rakib ................. H04L 12/2801 725/111
2016/0134447 A1 5/2016 Rumpunen et al.
2016/0269724 A1 9/2016 Bronkhorst
2018/0248983 A1* 8/2018 Mohebbi ................. H04L 12/66
2019/0356532 A1 11/2019 Hamzeh et al.
2021/0143865 A1 5/2021 Ariesen et al.
2021/0360884 A1 11/2021 Woytowitz
2024/0214008 A1 6/2024 Williams et al.
2024/0214820 A1 6/2024 Yeung et al.

OTHER PUBLICATIONS

"LLCC68, Long Range, Low Power, sub-GHz RF Transceiver", Jul. 2019, pp. 1-106, Semtech Corporation, Wireless & Sensing Products, Camarillo, California.
"SX1261/2, Long Range, Lower Power, sub-GHz RF Transceiver", Dec. 2021, pp. 1-114, Semtech Corporation, Wireless & Sensing Products, Camarillo, California.
"SX1302, LoRa Gateway Baseband Processor", Oct. 2020, pp. 1-31, Semtech Corporation, Wireless & Sensing Products, Camarillo, California.
"DBx smart RF amplifiers—DBE-1200S smart RF amplifier triple active output", Dec. 2021, EN/V11, Technetix Group Limited, technetix.com, pp. 1-4.
"ICON3100, Intelligent 1.8 GHZ Amplifier", 2021, Teleste Corporation, www.teleste.com, pp. 1-2.
"ICON4300, Intelligent 1.8 GHZ Amplifier", 2021, Teleste Corporation, www.teleste.com, pp. 1-2.

* cited by examiner

SYSTEMS AND METHODS FOR LOW DATA RATE, LOW POWER BI-DIRECTIONAL TRANSMISSIONS OVER EXISTING PHYSICAL COMMUNICATION MEDIA

CROSS-REFERENCE TO RELATED APPLICATION

The present application claims the benefit of U.S. Provisional Application Ser. No. 63/444,797, filed Feb. 10, 2023, which is fully incorporated herein by reference.

TECHNICAL FIELD

The present disclosure relates to communications, and more particularly, to systems and methods for providing low data rate, low power, bi-directional transmissions over existing physical communication media using spread-spectrum signals together with downstream and upstream primary signals.

BACKGROUND INFORMATION

Broadband communication networks are used to provide high speed, high bandwidth transmissions over communication paths to and from devices in the network. In some broadband networks, such as hybrid fiber-coaxial (HFC) networks used for CATV, at least a portion of the communication path includes coaxial cables that carry both downstream and upstream radio frequency (RF) signals. In a CATV network, for example, the downstream RF signals may include video and IP data transmitted from a headend of the HFC network to subscriber devices and the upstream RF signals may include control and IP data transmitted from subscriber devices to the headend. In such broadband networks, there is often a desire to transmit additional information, such as control or status data, to and from devices in the network, for example, to have a more resilient and reliable broadband network and to be able to perform preemptive strategic maintenance to avoid outages. However, providing additional bi-directional transmissions over the coaxial cables and other physical communication media without interfering with the existing downstream and upstream RF signals presents challenges.

In an HFC network, for example, the coaxial distribution network may include RF amplifiers to extend the transmission distance of the RF signals and thus extend the reach of the CATV services provided to subscriber locations. Providing bi-directional communication with the RF amplifiers is desirable for purposes of remotely controlling and/or monitoring the RF amplifiers. According to one solution, a DOCSIS cable modem transponder may be included in the RF amplifier to provide control of and communication with the RF amplifier; however, DOCSIS transponders tend to consume significant power and generate significant heat. As the bandwidth of broadband networks increases (e.g., up to 1.8 GHz and higher), managing the power consumption and heat generated in the network devices has been a bigger challenge. In an RF amplifier in a CATV network, in particular, amplification of the CATV RF signals may consume significant power while generating excessive heat, particularly with the expanding bandwidth of CATV networks. Including additional components in the RF amplifier may create additional challenges with respect to reducing power consumption and limiting energy dissipation and heat.

Accordingly, there is a need for a relatively low power system and method for providing bi-directional communication over existing coaxial cables in a broadband network without substantially interfering with the existing downstream and upstream RF signals.

SUMMARY

In accordance with one aspect of the present disclosure, a method is provided for communication in a network including a physical communication medium coupled to a plurality of network devices, wherein at least one of the network devices includes a transponder. The method includes: transmitting at least downstream primary signals over the physical communication medium to at least one of the network devices, wherein the downstream primary signals include multiplexed narrowband modulated signals; and establishing bi-directional transmissions between the transponder in the network device and a gateway device, wherein the bi-directional transmissions use spread-spectrum modulated signals on the physical communication medium together with the downstream primary signals, wherein the spread-spectrum modulated signals used for the bi-directional transmissions have a lower data rate and less power than the downstream primary signals and are positioned in frequency relative to the downstream primary signals such that the bi-directional transmissions occur without detectable interference with the downstream primary signals.

In accordance with another aspect of the present disclosure, a system includes a plurality of network devices configured to receive downstream primary signals, a physical communication medium coupled to the plurality of network devices, and a gateway device coupled to the physical communication medium. At least one of the network devices includes a transponder configured to establish bi-directional transmissions using spread-spectrum modulated signals. The downstream primary signals include multiplexed narrowband modulated signals, and the spread-spectrum modulated signals used for the bi-directional transmissions have a lower data rate and less power than the downstream primary signals and are positioned in frequency relative to the downstream primary signals such that the bi-directional transmissions occur without detectable interference with the downstream primary signals. The physical communication medium is configured to carry the spread-spectrum modulated signals together with at least the downstream primary signals, and the gateway device includes at least one gateway transceiver configured to transmit and receive the spread-spectrum modulated signals.

BRIEF DESCRIPTION OF THE DRAWINGS

These and other features and advantages will be better understood by reading the following detailed description, taken together with the drawings wherein.

DETAILED DESCRIPTION

Figure 1:
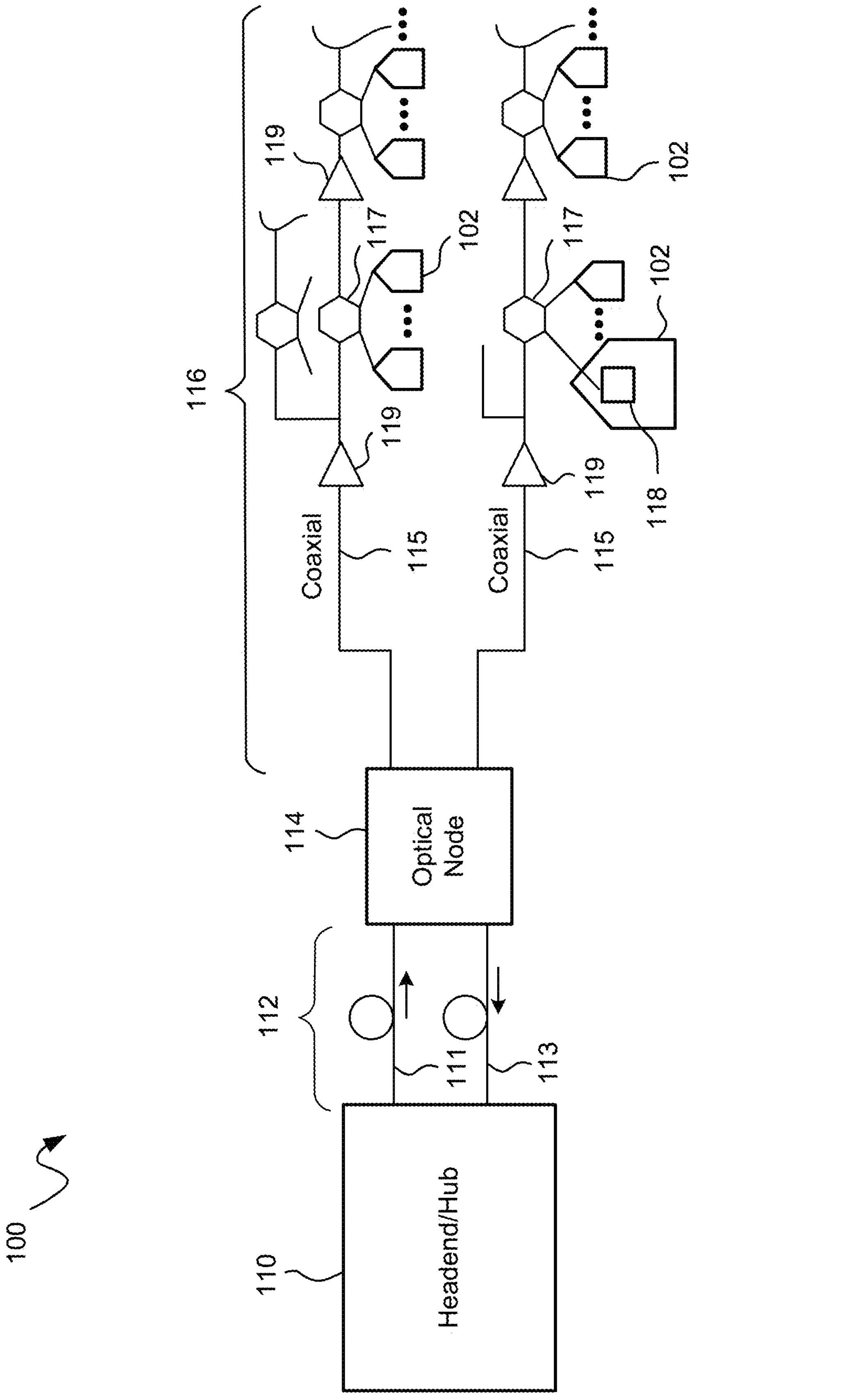
FIG. 1 is a schematic diagram of a hybrid fiber-coaxial (HFC) network used for CATV, consistent with embodiments of the present disclosure.

Systems and methods for low data rate, low power, bi-directional transmissions, consistent with embodiments of the present disclosure, may be provided over existing physical communication media (e.g., coaxial cables and/or optical fiber) and in the presence of higher bandwidth, higher power primary signals currently being transmitted over the communication media. The low data rate, low power, bi-directional transmissions may be accomplished using spread-spectrum modulated signals that are positioned in frequency relative to the primary signals, such that the low data rate, low power transmissions occur without detectable interference with the primary signals, which include multiplexed narrowband modulated signals. In some embodiments, the primary signals may be modulated using quadrature amplitude modulation (QAM) and multiplexed using orthogonal frequency division multiplexing (OFDM) and the spread-spectrum modulated signals may be chirp spread spectrum (CSS) modulated signals modulated using Gaussian frequency shift keying (GFSK). One example of the spread-spectrum modulated signals is implemented using LoRa technology and communication protocols defined by the LoRaWAN standard. Although the systems and methods for low data rate, low power, bi-directional transmissions are described in the context of a hybrid fiber-coaxial (HFC) network to communicate with network devices (e.g., nodes and/or RF amplifiers), such transmissions may be implemented in any type of network using existing physical communication media for higher bandwidth communications.

As used herein, "channel" refers to a sub-range of frequencies within a spectrum of frequencies, which are capable of being modulated to carry information. A "channel" may be identified as a single frequency in the sub-range of frequencies, and as used herein, "selecting a channel" may include selecting a single frequency that identifies the channel. As used herein, "primary communication channel" refers to a channel in a defined telecommunications frequency band (e.g., a CATV channel) and a "primary signal" refers to a signal transmitted using a primary communication channel. As used herein, a "downstream primary signal" (also referred to as a forward primary signal) is primary signal being sent from a source, such as a CATV headend/hub, to a destination, such as a CATV subscriber and an "upstream primary signal" (also referred to as a reverse primary signal) is a primary signal being sent from a destination, such as the CATV subscriber, to a source, such as the CATV headend/hub. As used herein, "channel spectrum" refers to a predefined range of radio frequencies divided into a plurality of sub-ranges of frequencies (referred to as physical channels) and capable of being modulated to carry information. A "CATV channel spectrum" is a channel spectrum used for delivering video and/or data in a CATV network and is not limited to a particular range of frequencies.

As used herein, "low data rate" refers to a data rate that is lower than the data rate of the primary signals on the primary communication channels and "low power" refers to a signal power that is lower than the signal power of the primary signals on the primary communication channels. For example, the "low data rate" may be in the range of 5 kbps to 100 kbps and the "low power" may be between −10 dBm and 0 dBm.

As used herein, the terms "circuit" and "circuitry" refer to physical electronic components (i.e., hardware) and any software and/or firmware (i.e., code), which may configure the hardware, be executed by the hardware, and/or otherwise be associated with the hardware. A particular processor and memory, for example, may comprise a first "circuit" when executing a first portion of code to perform a first function and may comprise a second "circuit" when executing a second portion of code to perform a second function. As used herein, the term "coupled" refers to any connection, coupling, link or the like between elements. Such "coupled" elements are not necessarily directly connected to one another and may be separated by intermediate components.

FIG. 1 illustrates an example of a hybrid fiber-coaxial (HFC) network 100 used for CATV, which may implement low data rate, low power, bi-directional transmissions, consistent with embodiments of the present disclosure. The low data rate, low power, bi-directional transmissions may be implemented, for example, to communicate with a node 114 and/or line extender RF amplifiers 119 in the HFC network 100, as described in greater detail below. In general, the HFC network 100 is capable of delivering both cable television programming (i.e., video) and IP data services (e.g., internet and voice over IP) to customers or subscribers 102 through the same fiber optic cables and coaxial cables (i.e., trunk lines). Such a HFC network 100 is commonly used by service providers, such as Comcast Corporation, to provide combined video, voice and broadband internet services to the subscribers 102. Although example embodiments of HFC networks are described herein based on various standards (e.g., Data over Cable Service Interface Specification or DOCSIS), the concepts described herein may be applicable to other embodiments of CATV networks using other standards.

Multiple cable television channels and IP data services (e.g., broadband internet and voice over IP) may be delivered together simultaneously in the CATV network 100 by transmitting signals using frequency division multiplexing over a plurality of physical channels across a CATV channel spectrum. One example of the CATV downstream channel spectrum (also referred to as forward spectrum) includes channels from 650 MHz to 1794 MHz, but the CATV channel spectrum may be expanded even further to increase bandwidth for data transmission. In a CATV channel spectrum, some of the physical channels may be allocated for cable television channels and other physical channels may be allocated for IP data services. Other channel spectrums and bandwidths may also be used and are within the scope of the present disclosure.

In addition to the primary signals being carried downstream (also referred to as forward signals) to deliver the video and IP data to the subscribers 102, the HFC network 100 may also carry primary signals (e.g., IP data or control signals) upstream from the subscribers (also referred to as reverse signals), thereby providing bi-directional communication over the trunks. According to one example, the signal spectrum for the reverse signals carried upstream may be up to 600 MHZ.

The HFC network 100 generally includes a headend/hub 110 connected via optical fiber trunk lines 112 to one or more optical nodes 114, which are connected via a coaxial cable distribution network 116 to customer premises equipment (CPE) 118 at subscriber locations 102. The headend/hub 110 receives, processes and combines the content (e.g., broadcast video, narrowcast video, and internet data) to be carried over the optical fiber trunk lines 112 as optical signals. The optical fiber trunk lines 112 include forward path optical fibers 111 for carrying downstream optical signals from the headend/hub 110 and return or reverse path optical fibers 113 for carrying upstream optical signals to the headend/hub 110. The optical nodes 114 provide an optical-to-electrical interface between the optical fiber trunk lines 112 and the coaxial cable distribution network 116. The optical nodes 114 thus receive downstream optical signals and transmit upstream optical signals and transmit downstream (forward) RF electrical signals and receive upstream (reverse) RF electrical signals.

The cable distribution network 116 includes coaxial cables 115 including trunk coaxial cables connected to the optical node(s) 114 and feeder coaxial cables connected to the trunk coaxial cables. Subscriber drop coaxial cables are connected to the distribution coaxial cables using taps 117 and are connected to customer premises equipment 118 at the subscriber locations 102. The customer premises equipment 118 may include set-top boxes for video and cable modems for data. One or more line extender RF amplifiers 119 may also be coupled to the coaxial cables 116 for amplifying the forward signals (e.g., CATV signals) being carried downstream to the subscribers 102 and for amplifying the reverse signals being carried upstream from the subscribers 102. In this embodiment, as will be described in greater detail below, the optical node 114 and/or the line extender RF amplifiers 119 may include transponders and the headend/hub 110 may include a gateway device to implement the low data rate, low power, bi-directional transmissions together with the downstream and upstream primary signals, which have a higher bandwidth and power.

Figure 2:
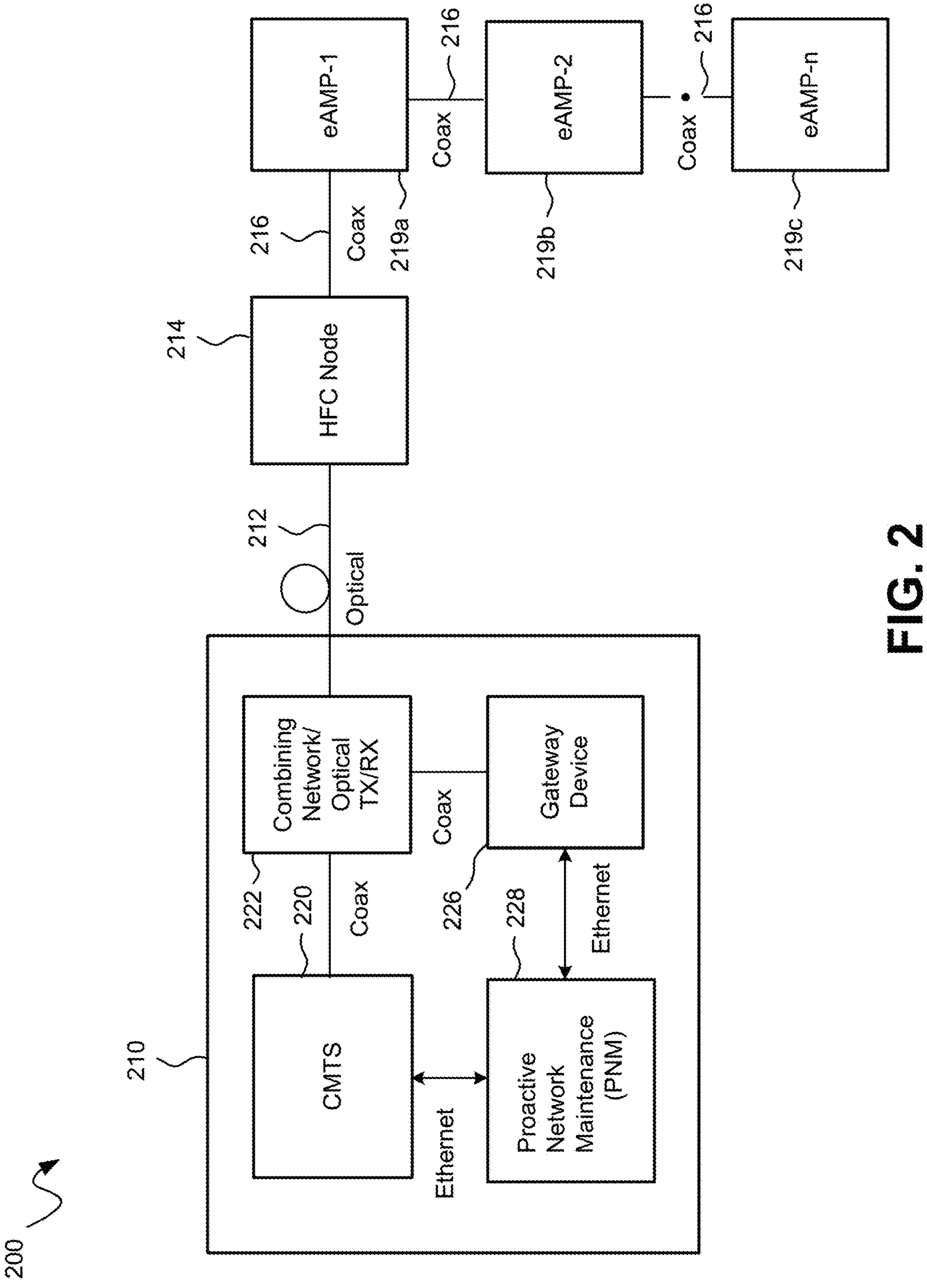
FIG. 2 is a schematic diagram of a traditional HFC network configured for low data rate, low power, bi-directional transmissions between network devices and a headend, consistent with embodiments of the present disclosure.

FIG. 2 shows an implementation of a system for low data rate, low power, bi-directional transmissions in a traditional HFC network 200, consistent with an embodiment. This embodiment of the HFC network 200 includes a headend 210 coupled to an HFC node 214 using optical fiber 212 and includes RF amplifiers 219*a-c* coupled to the HFC node 214 using coaxial cables 216, similar to the HFC network 100 described above and shown in FIG. 1. In this embodiment of the HFC network 200, analog communication is provided over the optical fiber 212 between the headend 210 and the HFC node 214.

In this embodiment of the HFC network 200, the headend 210 includes a cable modem termination system (CMTS) 220 coupled to a combining network and optical transmitters and receivers (collectively referred to as Combining Network/Optical TX/RX 222). The CMTS 220 provides the MAC and PHY layer connection to the cable modems at subscriber locations (not shown in FIG. 2) for transmitting downstream primary signals to the subscribers and receiving upstream primary signals from the subscribers. The optical transmitters and receivers in the Combining Network/Optical TX/RX 222 transmit and receive analog optical signals over the optical fiber 212, and the combining network in the Combining Network/Optical TX/RX 222 combines and separates signals that are transmitted and received by the optical transmitters and receivers.

To establish the low data rate, low power bi-directional transmissions, the headend 210 also includes a gateway device 226, which may be implemented as a shelf in the headend 210, coupled to the Combining Network/Optical TX/RX 222. In this embodiment, the low data rate, low power bi-directional transmissions may be combined with the analog downstream and upstream primary signals in the combining network and transmitted and received by the optical transmitters and receivers. The node 214 and/or RF amplifiers 219*a-c* may include transponders (not shown in FIG. 2) for establishing the low data rate, low power bi-directional transmissions with the gateway device 226, as will be described in greater detail below.

Figure 3:
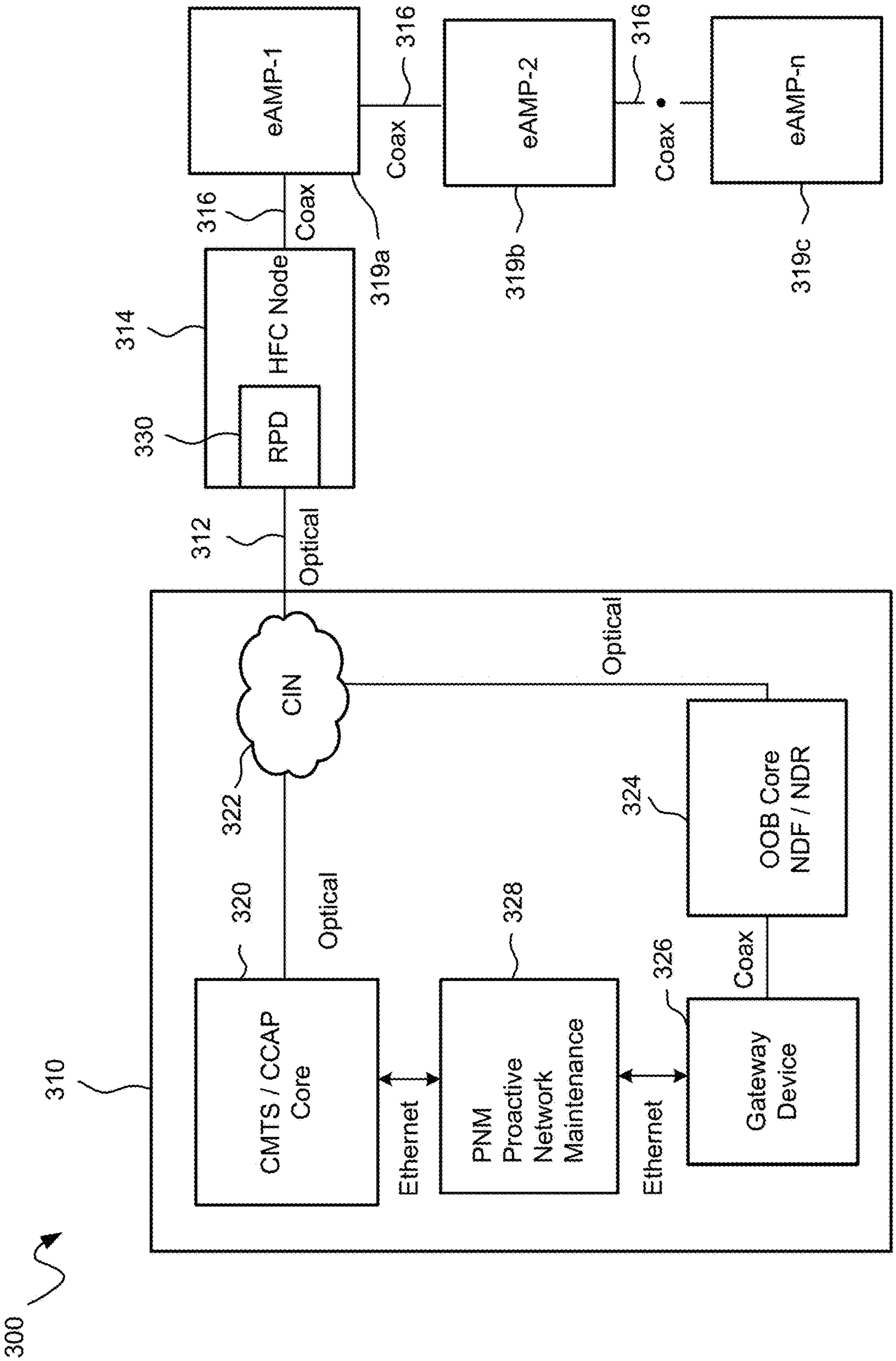
FIG. 3 is a schematic diagram of a remote PHY (R-PHY) HFC network configured for low data rate, low power, bi-directional transmissions between network devices and a headend, consistent with embodiments of the present disclosure.

FIG. 3 shows an implementation of a system for low data rate, low power, bi-directional transmissions in a remote PHY type HFC network 300, consistent with another embodiment. This embodiment of the HFC network 300 also includes a headend 310 coupled to an HFC node 314 using optical fiber 312 and includes RF amplifiers 319*a-c* coupled to the HFC node 314 using coaxial cables 316, similar to the HFC network 100 described above and shown in FIG. 1. In this embodiment of the HFC network 300, digital communication is provided over the optical fiber 312 between the headend 310 and the HFC node 314, and the HFC node 314 includes a remote PHY device (RPD) 330 to handle the digital communications.

In this embodiment of the HFC network 300, the headend 310 includes an integrated CMTS or Converged Cable Access Platform (CCAP) core 320 coupled to a converged interconnected network (CIN) 322. The CCAP core 320 and the CIN 322 provide digitized optical communication with the RPD 330 in the HFC node 314. The headend 310 also includes a gateway device 326 to establish the low data rate, low power bi-directional transmissions. In this embodiment, the analog low data rate, low power bi-directional transmissions are digitized for communication between the CIN 322 and the RPD 330 in the HFC node 314. The RPD 330 converts upstream signals from analog to digital and converts downstream signals from digital to analog, and the headend 310 may include an OOB core 324 coupled to the gateway device 326 to handle the A/D and D/A conversion in the headend 310 for the low data rate, low power bi-directional transmissions.

The OOB core 324 may use known technologies and standards in the DOCSIS R-PHY specifications referred to as the OOB (out-of-band) communication protocols, which are further defined in the remote out-of-band (CM-SP-R-OOB) specification. As defined in the CM-SP-R-OOB specification, Narrowband Digital Forward (NDF) and Narrowband Digital Return (NDR) digitizes a small portion of the spectrum and sends the digital samples as payload within packets that traverse between the CMTS/CCAP core 320 and the RPD 330. This approach works with any type of OOB signal as long as the signal can be contained within the defined pass bands. The following Tables 16 and 18 are reproduced from the CM-SP-R-OOB specification and set forth the NDF and NDR Channel Parameters that may be used.

TABLE 16

NDF Channel Parameters

| Parameter | Value | RPD Support | CCAP Core Support |
|---|---|---|---|
| Channel Width | Mode 0: 80 kHz | SHOULD | SHOULD |
| | Mode 1: 160 kHz | SHOULD | SHOULD |
| | Mode 2: 320 kHz | SHOULD | SHOULD |
| | Mode 3: 640 kHz | SHOULD | SHOULD |
| | Mode 4: 1.28 MHz | MUST[1] | SHOULD |
| | Mode 5: 2.56 MHz | MUST[1] | SHOULD |
| | Mode 6: 5.12 MHz | MUST[1] | SHOULD |
| | Mode 7: 25.6 MHz[2] | MAY | SHOULD |
| Center Frequency | 70-130 MHz[3] | MUST | SHOULD |
| | 50-1000 MHz | SHOULD | SHOULD |
| Allocated Guardband | 20% of channel width[2] (10% each side) | MUST | SHOULD |
| Sample Resolution | 10 bits | MUST | SHOULD |

TABLE 18

NDR Channel Parameters

| Parameter | Value | RPD Support | CCAP Core Support |
|---|---|---|---|
| Channel Width | Mode 0: 80 kHz | SHOULD | SHOULD |
| | Mode 1: 160 kHz | MUST[1,2] | SHOULD |
| | Mode 2: 320 kHz | MUST[1,2] | SHOULD |
| | Mode 3: 640 kHz | MUST[1,2] | SHOULD |
| | Mode 4: 1.28 MHz | MUST[1,2] | SHOULD |
| | Mode 5: 2.56 MHz | MUST[1,2] | SHOULD |
| | Mode 6: 5.12 MHz | MUST[1,2] | SHOULD |
| Center Frequency | 5-42 MHz | MUST | SHOULD |
| Allocated Guardband | 20% of channel width (10% each side) | MUST | SHOULD |
| Sample Resolution | 10 bits | MUST | SHOULD |

In both embodiments of the HFC network 200, 300 described above, the headend 210, 310 may include a proactive network maintenance (PNM) system 228, 328 coupled to the CMTS 220, 320 and the gateway device 226, 326. The PNM system 228, 328 may be used by cable operators to perform strategic maintenance of a network preemptively to avoid long outages and to have a more resilient and reliable broadband network. Commands and/or data used by the PNM system 228, 328 may be transmitted and received via the low data rate, low power bi-directional transmissions established using the gateway device 226, 326 to provide network maintenance. The PNM system 228, 328 may include existing PNM systems known to those skilled in the art. The headend 210, 310 may use the gateway device 226, 326 and the low data rate, low power bi-directional transmissions to communicate the commands and/or data for managing a large number of network devices, such as nodes and RF amplifiers, in the HFC network 200, 300 using existing network management and control systems. The systems and methods for low data rate, low power bi-directional transmissions, consistent with embodiments of the present disclosure, thus provide a relatively simple, reliable and low cost solution for monitoring, controlling and managing broadband networks without detectable interference with the primary broadband signals.

In the embodiments of the HFC networks 100, 200, 300 described above the low data rate, low power bi-directional transmissions may use spread-spectrum modulated signals that are positioned in frequency relative to the primary signals (e.g., multiplexed narrowband modulated signals), such that the low data rate, low power transmissions occur without detectable interference with the primary signals. The spread-spectrum signals may be transmitted with downstream primary signals, for example, at frequencies between 150 MHz to 960 MHz and with upstream primary signals, for example, at frequencies between 5 MHz to 85 MHz. The spread-spectrum modulated signals may be chirp spread spectrum (CSS) modulated signals modulated using Gaussian frequency shift keying (GFSK). GFSK modulation may be used at fixed frequencies with bandwidths up to 500 KHz, and the spread spectrum bandwidths may be from 7 KHz to 500 KHz. The use of spread spectrum technology reduces the chance of interference with or being interfered by other signals (e.g., primary downstream and upstream signals). One example of the spread-spectrum modulated signals is implemented using LoRa technology and communication protocols defined by the LoRaWAN standard, as will be described in greater detail below.

Figure 4:
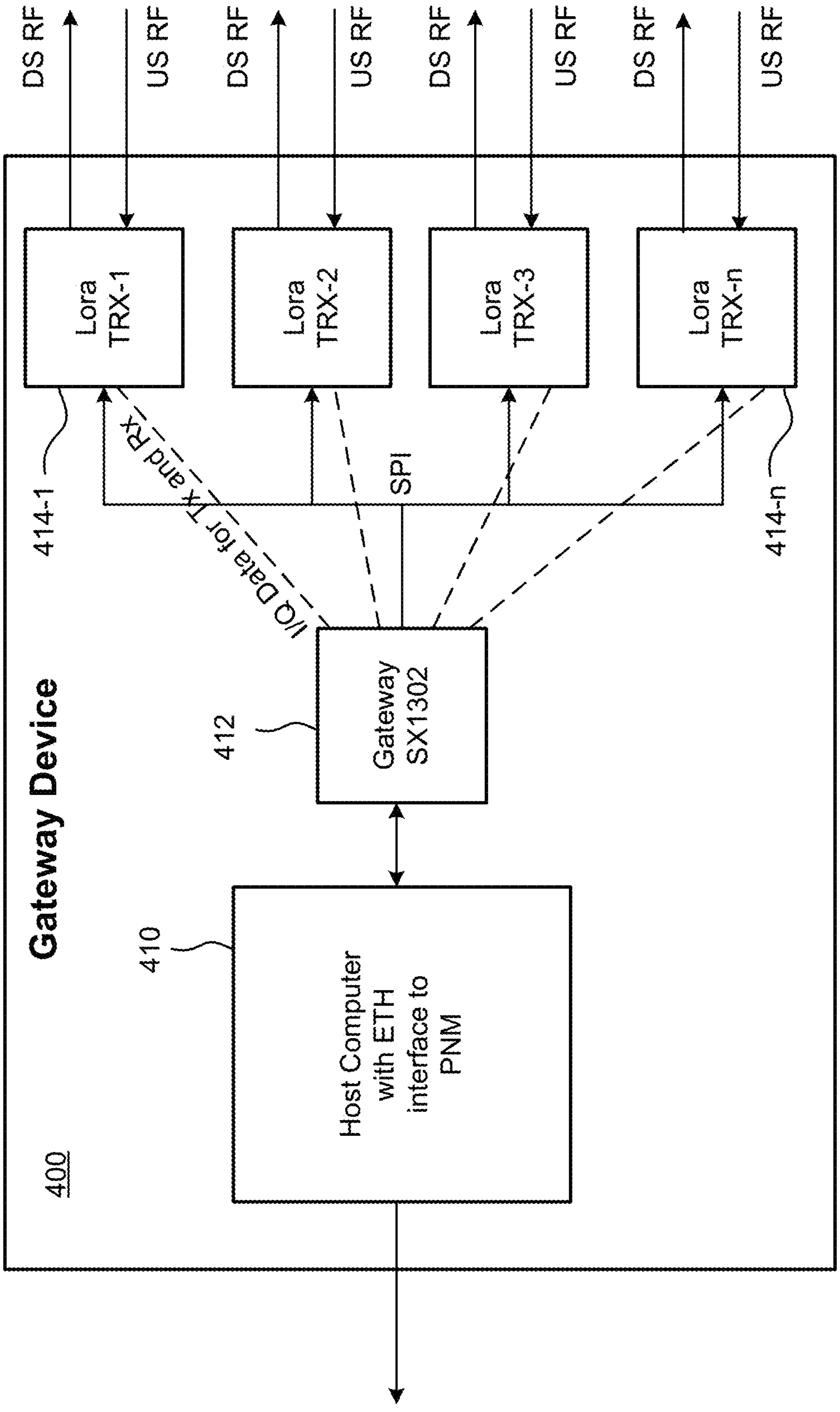
FIG. 4 is a schematic diagram of a gateway device for use in a headend of the HFC network to provide low data rate, low power, bi-directional transmissions, consistent with embodiments of the present disclosure.

Referring to FIG. 4, an embodiment of a gateway device 400 that may be used for the gateway devices 226, 326 in HFC networks 200, 300 is described in greater detail. In this embodiment, the gateway device 400 includes a host computer 410 that provides a data interface (e.g., ethernet) to the PNM system or other type of system or application server in the headend. A gateway processor 412 (e.g., a LoRa gateway processor) is coupled to the host computer 410 and a plurality of gateway transceivers 414-1 to **414-*n* (e.g., LoRa transceivers) are coupled to the gateway processor 412 for transmitting and receiving the spread-spectrum signals as downstream RF signals (DS RF) and upstream RF signals (US RF). The gateway processor 412 may be coupled to the transceivers 414-1 to 414-*n*** using a serial peripheral interface (SPI).

The gateway processor 412 modulates data from the host computer 410 and provides I/Q data to the gateway transceivers 414-1 to **414-*n* for the downstream RF signals (DS RF). The gateway processor 412 also receives I/Q data from the gateway transceivers 414-1 to 414-*n* for the upstream RF signals (US RF) and demodulates the data. As discussed above, the downstream (DS RF) and upstream (US RF) spread-spectrum RF signals from and to the gateway transceivers 414-1 to 414-*n* may be transmitted and received with the downstream and upstream primary signals via the combining network/optical TX/RX 222 in the HFC network 200 (see FIG. 2) or via the OOB core 324 in the HFC network 300 (see FIG. 3**).

Where LoRa technology is used for the low data rate, low power bi-directional transmissions, the host computer 410, the gateway processor 412 and the gateway transceivers 414-1 to **414-*n* operate in accordance with the LoRa network architecture, protocols and frame format described in greater detail below. In an embodiment where the host computer 410 is connected to a PNM system (e.g., PNM systems 228, 328), the host computer 410 translates PNM commands and data to Lora TCP/IP commands and data. One example of the gateway processor 412 is the LoRa gateway baseband processor SX1302 available from Semtech Corporation and one example of the gateway transceivers 414-1 to 414-***n* are LoRa transceivers available from Semtech Corporation.

Figure 5:
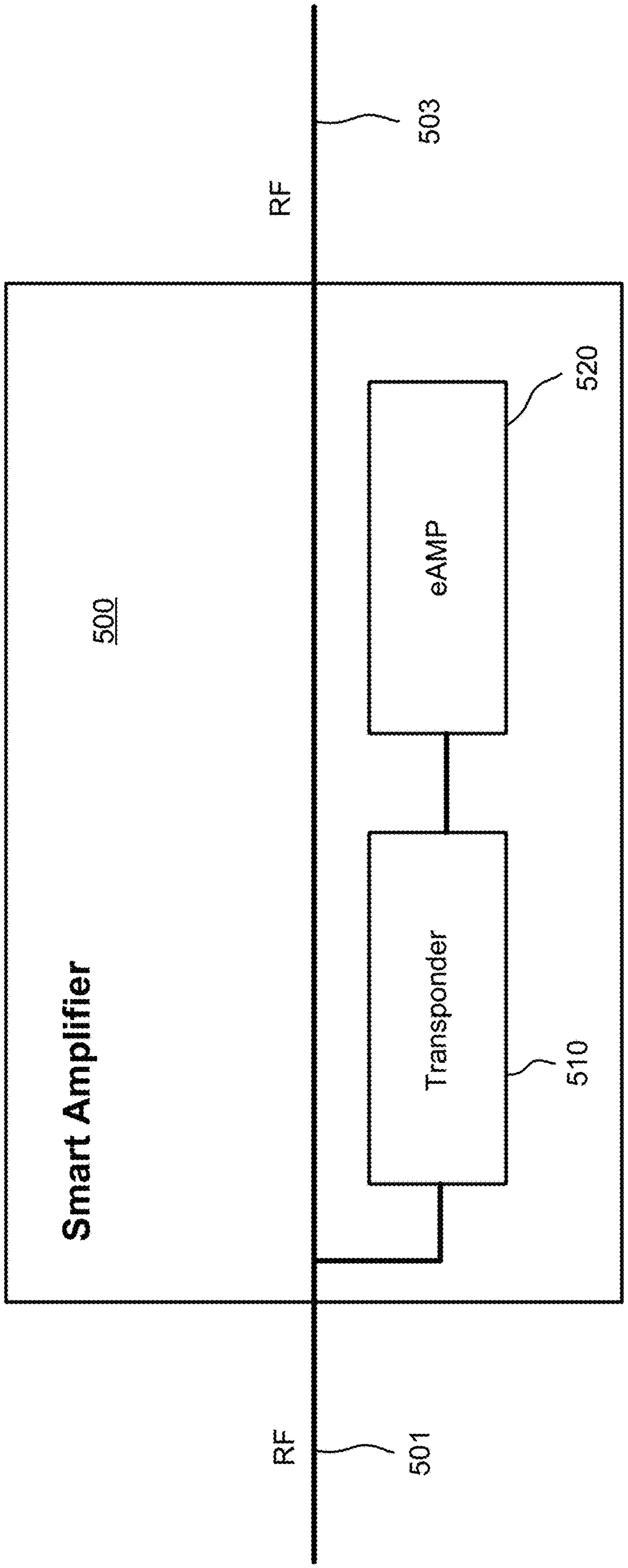
FIG. 5 is a schematic diagram of an RF amplifier including electronic amplifier circuitry and a transponder for low data rate, low power, bi-directional transmissions, consistent with embodiments of the present disclosure.

As shown in FIG. 5, an RF amplifier 500 (e.g., RF amplifiers 219*a-c* in HFC network 200 or RF amplifiers 319*a-c* in HFC network 300) may include a transponder 510 together with the electronic amplifier circuitry (eAMP) 520, consistent with embodiments of the present disclosure. The transponder 510 provides the low data rate, low power, bi-directional transmissions with a gateway device in a headend (e.g., gateway devices 226, 326 in the headends 210, 310), for example, to send data signals from the amplifier 500 to the headend and/or to receive control signals from the headend in the amplifier 500. The transponder 510 provides the low data rate, low power, bi-directional transmissions together with the upstream and downstream primary signals over the coaxial cables 501, 503 coupled to the RF amplifier 500.

Similar to the transceivers 400-1 to 400-*n* in the gateway device 400, the transponder 510 uses spread-spectrum modulated RF signals, such as CSS modulated signals or LoRa signals, to provide the low data rate, low power, bi-directional transmissions. In particular, the transponder 510 may receive downstream RF signals (DS RF) from the gateway device 400 using a downstream path and may transmit upstream RF signals (DS RF) to the gateway device 400 using an upstream path. By using spread-spectrum modulated signals, such as CSS modulated signals or LoRa signals, the transponder 510 may transmit and receive the RF signals using relatively low power, e.g., consuming less than 1 watt inside of the amplifier 500, which helps manage power consumption and head in the RF amplifier 500. The transponder 510 also provides a robust RF interface, for example, with more than 130 dB of dynamic range and the ability to recover signals up to 20 dB below the average noise.

Figure 5A:
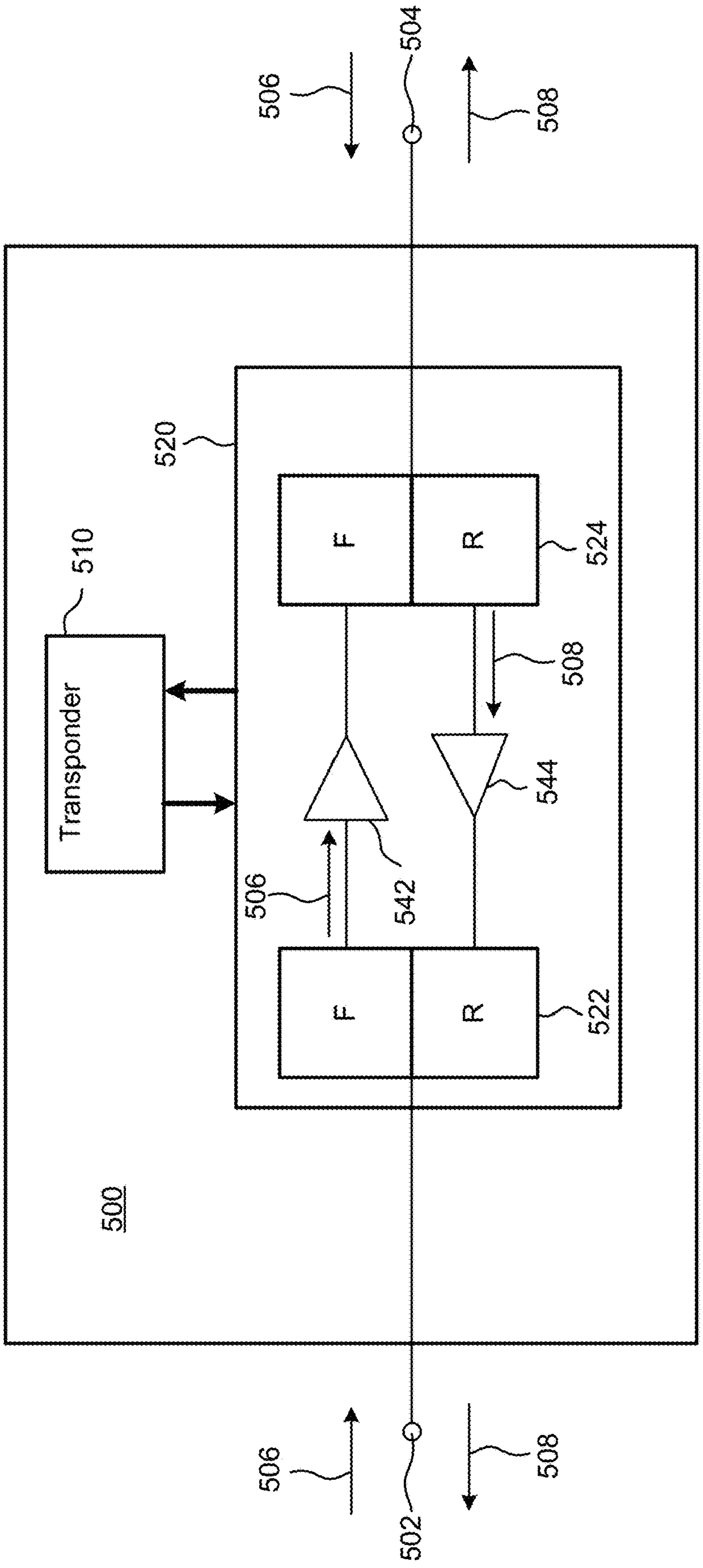
FIG. 5A is a schematic diagram illustrating an embodiment of the electronic amplifier circuitry in the RF amplifier of FIG. 5.

One embodiment of the CAMP circuitry 520 is shown in greater detail in FIG. 5A. In this example, the RF amplifier 500 includes first and second ports 502, 504 configured to be coupled to an electrical path carrying forward and reverse RF signals 506, 508, such as the coaxial cable carrying forward RF signals downstream and carrying reverse RF signals upstream in a CATV network. The first port 502 provides an input for forward signals 506 and an output for reverse signals 508, and the second port 504 provides an input for reverse signals 508 and an output for forward signals 506.

The eAMP circuitry 520 includes a first diplex filter 522 coupled to the port 502, a second diplex filter 524 coupled to the port 504, and forward and reverse gain stages 542, 544 coupled between the diplex filters 522, 524. The diplex filters 522, 524 separate the forward and reverse signals that travel on the same electrical path at the ports 502, 504. The first diplex filter 522 separates and passes the forward signals 506 received on the first port 502 for amplification by the forward gain stage 542, and the second diplex filter 524 separates and passes the reverse signals 508 received on the second port 504 for amplification by the reverse gain stage 544. The diplex filters and gain stages may be implemented using known circuit components in RF amplifiers.

The CAMP circuitry 520 may also include circuitry (not shown) for conditioning the forward and reverse RF signals 506, 508, such as automatic gain control (AGC) and/or automatic level/slope control (ALSC) circuitry, which provide gain control and/or tilt control. One example of AGC circuitry is described in greater detail in U.S. patent application Ser. No. 17/945,600, now U.S. Pat. No. 11,863,145, which is commonly owned and fully incorporated herein by reference.

Figure 5B:
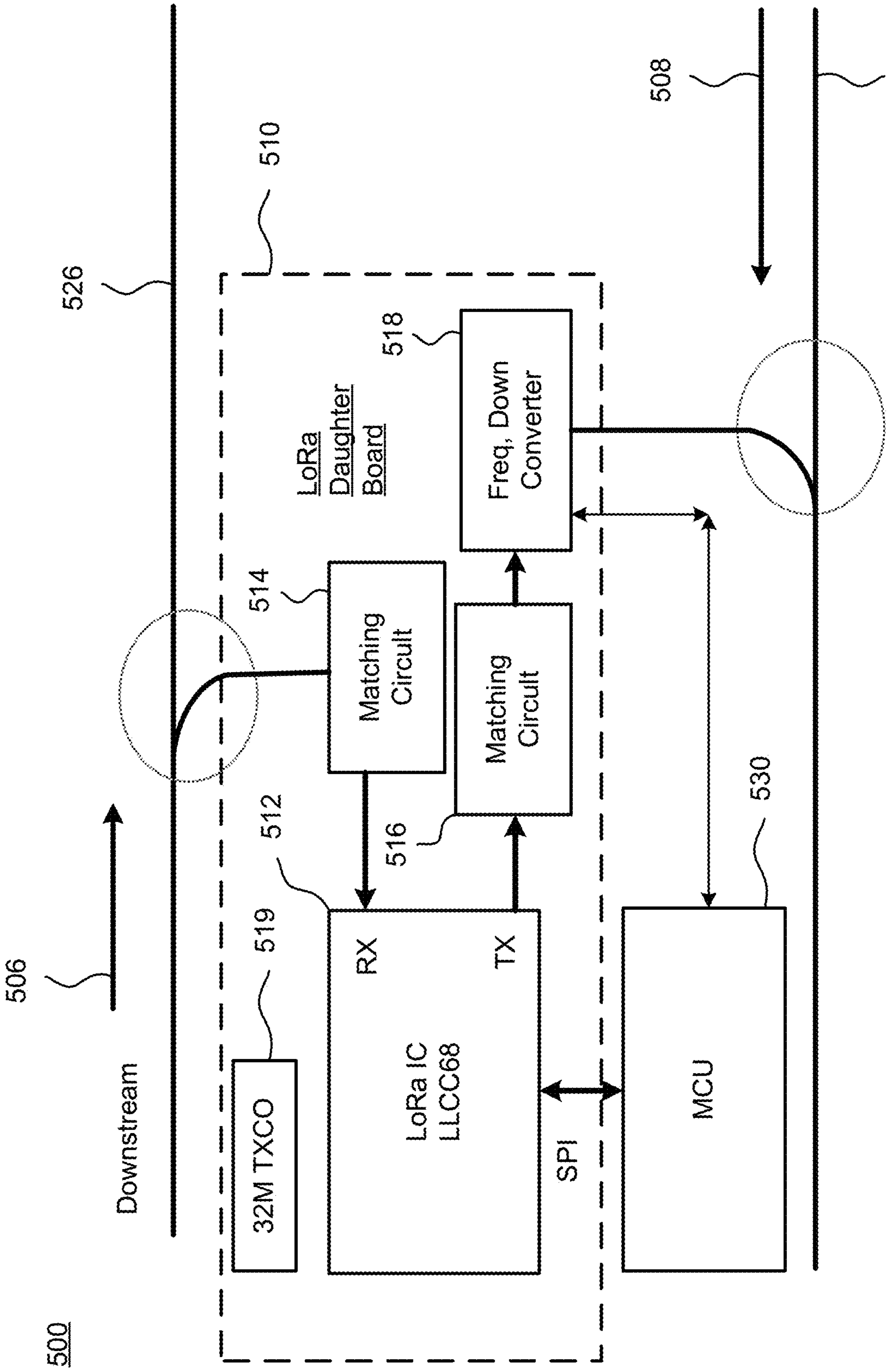
FIG. 5B is a schematic diagram illustrating an embodiment of the transponder in the RF amplifier of FIG. 5.

One embodiment of the transponder 510 is shown in greater detail in FIG. 5B. The transponder 510 may be implemented as a daughter board in the RF amplifier 500 and is connected to a microcontroller unit (MCU) 530 in the RF amplifier 500. The transponder 510 is also coupled to electrical paths 526, 528 that carry the downstream and upstream RF signals 506, 508, respectively.

In this embodiment, the transponder 510 includes an RF transceiver 512 that transmits and receives the spread-spectrum modulated signals used in the low data rate, low power bi-directional transmission. The RF transceiver 512 may be coupled to the MCU 530 in the RF amplifier 500 with a fast SPI interface. An RX matching circuit 514 couples the RX input of the RF transceiver 512 to the downstream RF path 526 and a TX matching circuit 516 and frequency downconverter 518 couple the TX output of the RF transceiver 512 to the upstream RF path 528. The frequency downconverter 518 may be an ADI low power active mixer to down-convert the frequency into an upstream band. Examples of the RF transceiver 512 include the LoRa long range, lower power, sub-GHz RF transceivers, SX1261 and LLCC68, available from Semtech Corporation. The transponder 510 may also include a temperature compensated crystal oscillator (TXCO) 519 to ensure over-temperature frequency stability.

In this embodiment, the RF amplifier 500 may be a smart amplifier where the MCU 530 and other circuitry monitor and/or control the amplifier, for example, by adjusting attenuation and tilt. A smart amplifier may also allow a local setup and control via USB or a wireless interface. If the RF amplifier 500 is a smart amplifier, the transponder 510 may be used to transmit and receive amplifier data and commands to monitor, control and/or set up the amplifier 500 remotely from the headend. The data transmitted by transponder 510 in the RF amplifier 500 to the headend may include, without limitation, AC current draw, DC current draw, DC voltage levels, amp temperature, uptime, alarm conditions (possibly configured by the customer) and operational RF conditions such as output RF power and tilt in both the downstream and upstream directions. The commands transmitted from the headend to the transponder 510 in the RF amplifier 500 may include, without limitation, request of status, change of output power, change of output tilt, request for diagnostic operations such as the muting of an upstream port to assist in isolation of problem sections of a cascade of amps. The headend may also be able to initiate an amp reset and update of the firmware.

The transponder 510 may thus report all registers in the amplifier 500 and may cause the MCU 530 to change operational parameters of the amplifier, for example, following the SCTE-279 specification. Alternatively or additionally, a similar transponder may be implemented in a node of an HFC network, such as node 214 in HFC network 200 or node 314 in HFC network 300, to provide similar monitoring and/or control of the node.

Figure 6:
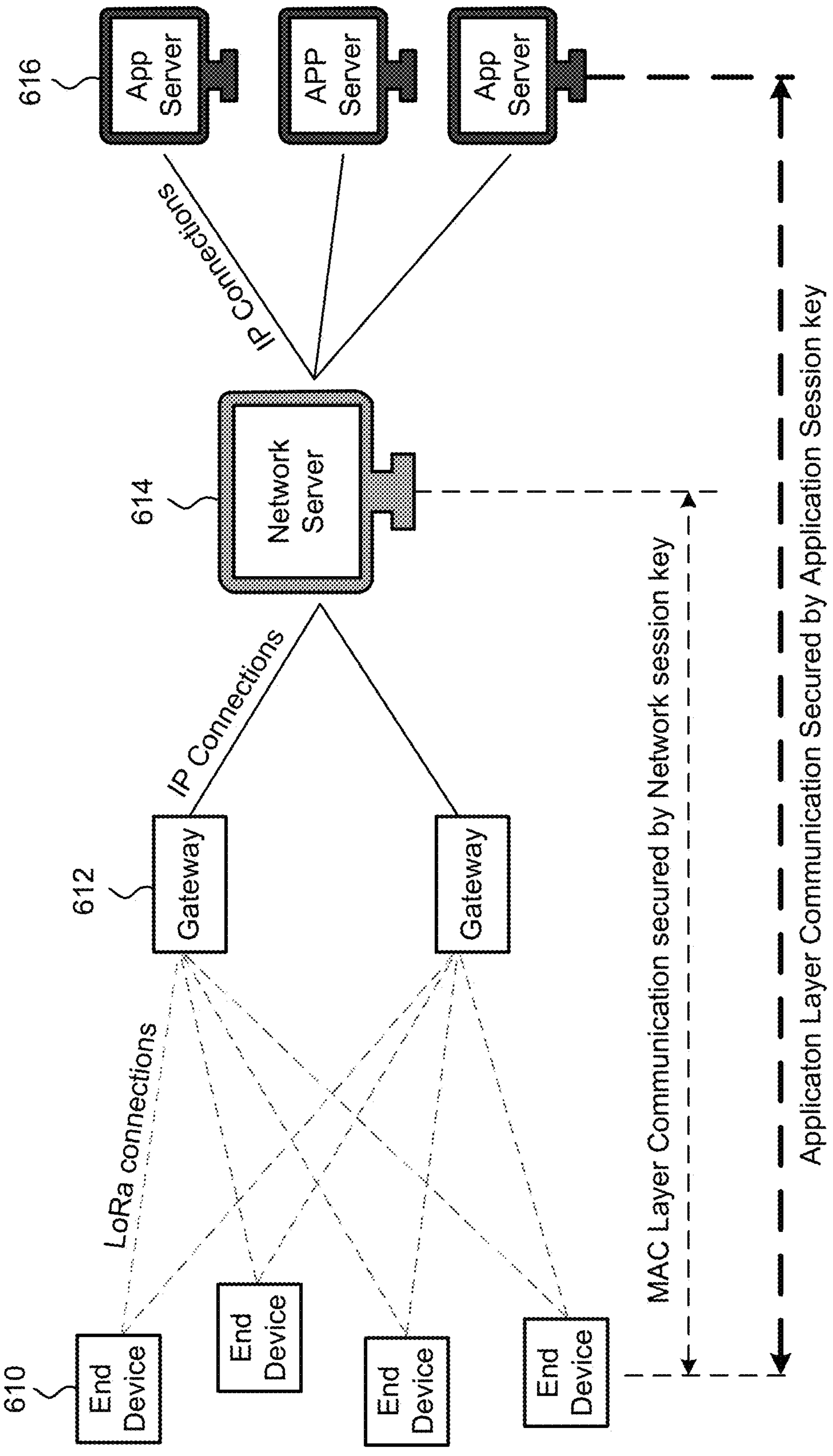
FIG. 6 is a schematic diagram of a LoRa network architecture that may be used to implement the low data rate, low power, bi-directional transmissions, consistent with embodiments of the present disclosure.
Figure 7:
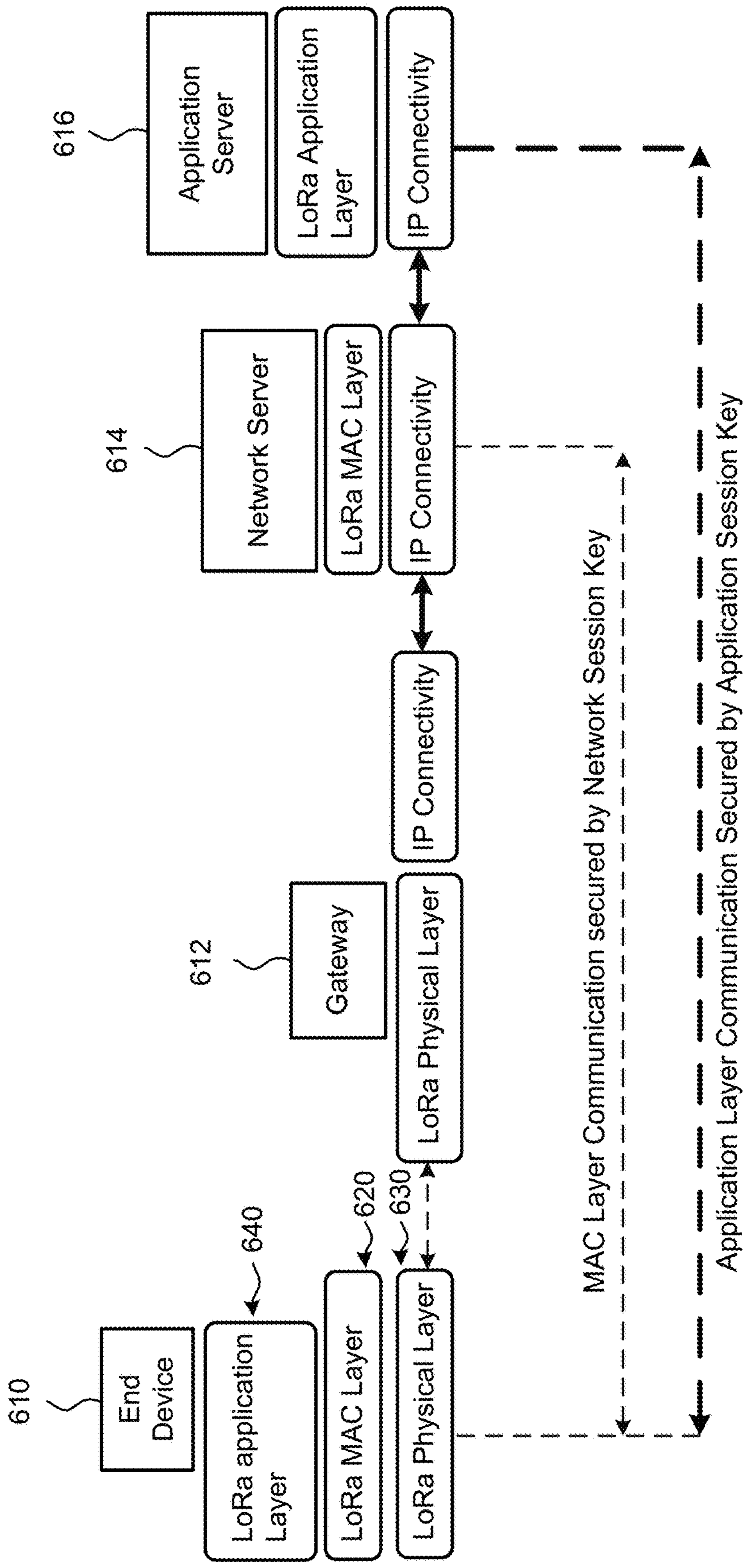
FIG. 7 is a schematic diagram of LoRa network protocols that may be used to implement the low data rate, low power, bi-directional transmissions, consistent with embodiments of the present disclosure.

FIGS. 6-9 illustrate a LoRa network architecture (FIG. 6), protocol (FIGS. 7 and 8) and frame format (FIG. 9), which may be adapted for use in some embodiments described above to provide the low data rate, low power, bi-directional transmission. LoRa (Long Range) is long range, low data rate, low power wireless platform technology for building IoT networks. LoRa uses unlicensed radio spectrum in the Industrial, Scientific and Medical (ISM) bands to enable communication between remote sensors/devices 610 and gateways 612 connected to a network server 614 and application servers 616, as shown in FIGS. 6 and 7. Although LoRa was developed for wireless transmission and IoT networks, the LoRa technology may be advantageously used to provide low data rate, low power, bi-directional transmissions over physical communication media, such as coaxial cables and optical fibers in an HFC network, without detectable interference with the primary signals on such HFC networks (e.g., downstream and upstream CATV signals). The low data rate, low power, bi-directional transmissions described above may be implemented using the LoRa technology described below but are not necessarily limited to the details described below.

As shown in FIG. 6, a LoRa network uses a star topology in which an end node or end device 610 can send messages to multiple gateways 612 that communicate with the network server 614. Since an end device 610 does not belong to a specific gateway, more than one gateway 612 can receive a message sent by an end device 610. LoRa radio access technology is used in communications between an end device 610 and the gateways 612. The gateways 612 and network server 614 are connected via standard IP connections.

A LoRa end device 610 is used to send small amounts of data at low frequencies over long distances. Such LoRa transmissions from end devices 610 may be utilized in various applications such as smart city, smart building, factory automation, farm automation, and logistics. A LoRa gateway 612 is a LoRa base transceiver station (BTS) that receives packets from the end nodes 610 via a radio link and then forwards them to the network server 614 through the IP backhaul or 3G/4G broadband connections. The network server 614 manages the entire network. When the network server 614 receives packets, it removes the redundancy of packets and performs a security check and then determines the most suitable gateway 612 to send back an acknowledgement message. An application server 616 is the end server where all data sent by an end device 610 may be post processed and action may be taken.

Figure 8:
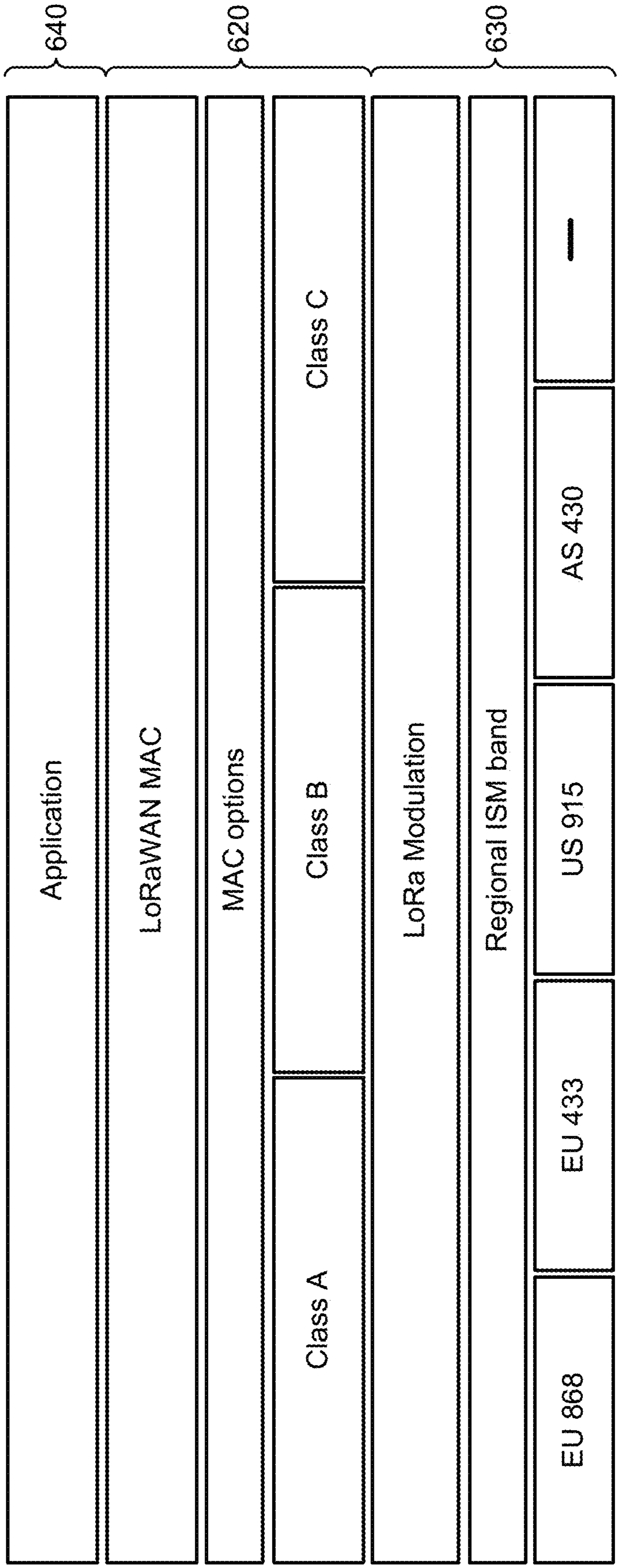
FIG. 8 is a schematic diagram of a LoRa protocol stack that may be used to implement the low data rate, low power, bi-directional transmissions, consistent with embodiments of the present disclosure.
Figure 9:
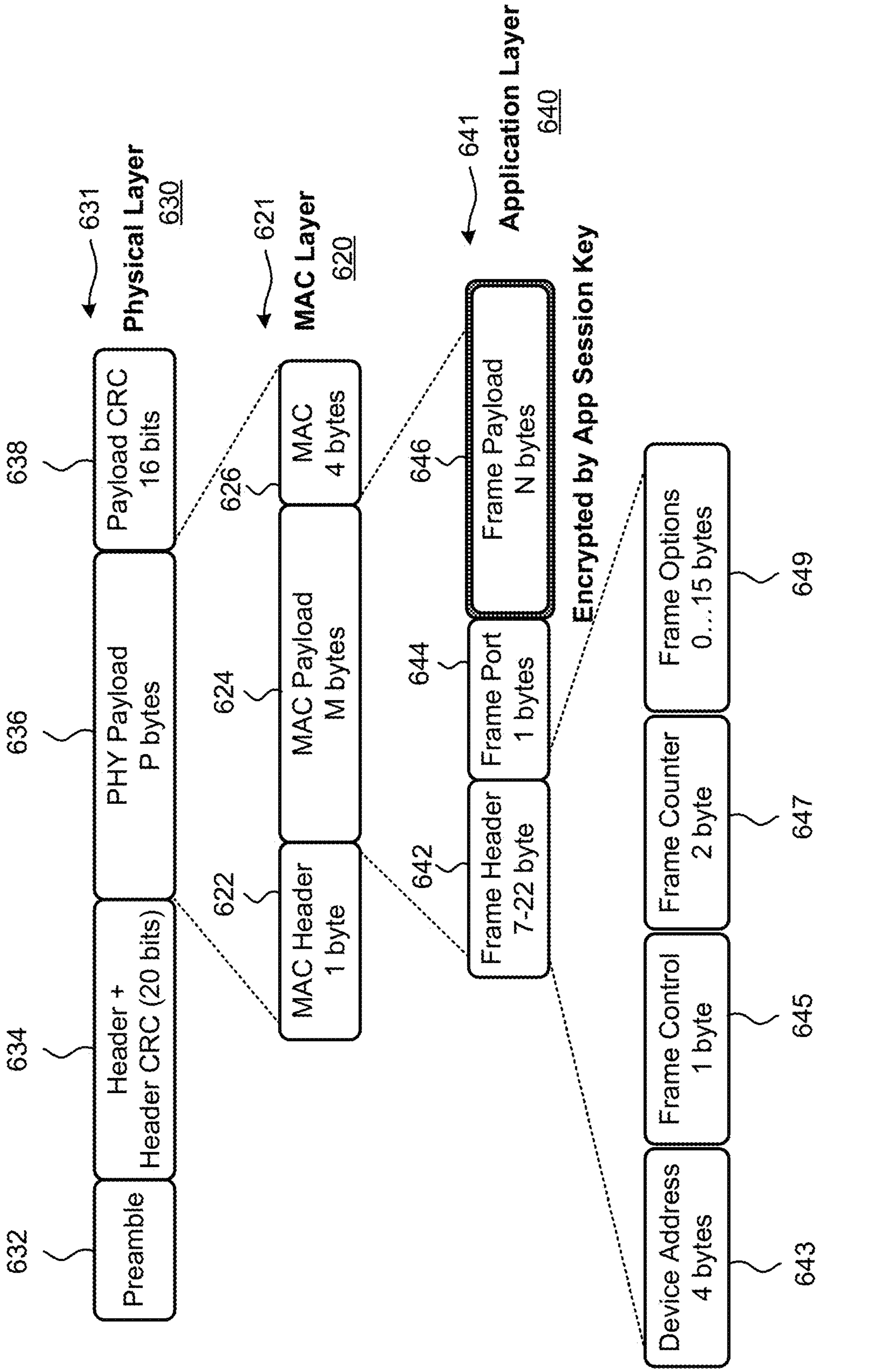
FIG. 9 is a schematic diagram of a LoRa frame format that may be used to implement the low data rate, low power, bi-directional transmissions, consistent with embodiments of the present disclosure.

FIG. 7 shows the end-to-end network protocol architecture consistent with the LoRa protocol specification developed by the LoRa Alliance. LoRaWAN's protocol includes a MAC layer 620 and an application layer 640 operating based on a LoRa physical layer 640. The MAC layer communication between an end device 610 and the network server 614 may be secured by a network session key, and the application layer communication between an end device 610 and an application server 616 may be secured by an application session key. FIG. 8 shows the LoRa protocol stack including the physical layer 630, the MAC layer 620, and the application layer 640. FIG. 9 shows the LoRa protocol frame structure for the physical layer 630, the MAC layer 620 and the application layer 640, as will be described in greater detail below.

Physical Layer Frame 621: At the physical (PHY) layer 630, a LoRa frame 631 starts with a preamble 632. Apart from a synchronization function, the preamble 632 defines the packet modulation scheme, being modulated with the same spreading factor as the rest of the packet. The preamble duration may be 12.25 Ts. The preamble 632 is followed by a PHY header and header CRC 634 that together are 20-bits long and are encoded with the most reliable code rate, while the rest of the frame is encoded with a code rate specified in the PHY header 634. The PHY header 634 also contains such information as payload length and whether the payload 16-bit CRC 638 is present in the frame. In a LoRa network, uplink frames contain payload CRC 638. The PHY payload 636 contains a MAC layer frame 621.

MAC Layer Frame 621: The MAC layer frame 621 processed in the MAC layer 620 includes a MAC header 622, a MAC payload 624, and a Message Integrity Code (MIC) 626. The MAC header 622 defines a protocol version and message type, i.e., whether it is a data or a management frame, whether it is transmitted in uplink or downlink, and whether it shall be acknowledged. The MAC header 622 may also notify that this is a vendor specific message. In a join procedure for end node activation, the MAC payload 624 may be replaced by a join request or join accept messages. The entire MAC header 622 and MAC payload 624 is used to compute the MIC value 626 with a network session key (Nwk_SKey). The value of the MIC 626 is used to prevent the forgery of messages and authenticate the end node.

Application Layer Packet 641: The MAC payload 624 contains an application layer packet 641 handled by the application layer 640 including a frame header 642, a frame port 644, and a frame payload 646. The value of the frame port 644 is determined depending on the application type. The frame payload 646 is encrypted with an application session key (App_SKey), and this encryption may be based on the AES 128 algorithm. In the frame header 642, the device address 643 contains two parts—first 8 bits identify the network and other bits are assigned dynamically during joining the network and identify the device in a network. The frame control 645 includes 1 byte for network control information, such as whether to use the data rate specified by the gateway for uplink transmission, whether this message acknowledges the reception of the previous message, and whether the gateway has more data for a mote device. The frame counter 647 is used for sequence numbering. The frame options 649 is for commands used to change data rate, transmission power and connection validation, etc.

LoRa is a spread spectrum modulation scheme that is a derivative of Chirp Spread Spectrum (CSS) modulation and which trades data rate for sensitivity within a fixed channel bandwidth. LoRa implements a variable data rate, utilizing orthogonal spreading factors, which allows the system designer to trade data rate for range or power, so as to optimize network performance in a constant bandwidth.

SNR (Signal to Noise Ratio) is the minimum ratio of wanted signal power to noise that can be demodulated. For receiver sensitivity calculation, the minimum SNR value is determined so that the information may be decoded correctly. The performance of the LoRa modulation itself, forward error correction (FEC) techniques and the spread spectrum processing gain combine to allow significant SNR improvements. This SNR value depends upon the spreading factor.

LoRa uses an unconventional definition of the spreading factor as the logarithm, in base 2, of the number of chirps per symbol. In LoRa, the chirp rate depends on the bandwidth, i.e., the chirp rate is equal to the bandwidth (one chirp per second per Hertz of bandwidth). In general, a lower spreading factor results in a higher data rate but lower range and a higher spreading factor results in a lower data rate but higher range.

Some example SNRs for LoRa modulation formats are shown in the table below.

| LoRa Spreading Factors (125 kHz bw) | | | | |
|---|---|---|---|---|
| Spreading Factor | Chips/ symbol | SNR limit | Time-on-air (10 byte packet) | Bitrate |
| 7 | 128 | −7.5 | 56 ms | 5469 bp |
| 8 | 256 | −10 | 103 ms | 3125 bps |
| 9 | 512 | −12.5 | 205 ms | 1758 bps |
| 10 | 1024 | −15 | 371 ms | 977 bps |
| 11 | 2048 | −17.5 | 741 ms | 537 bps |
| 12 | 4096 | −20 | 1483 ms | 283 bps |

LoRa modulation is a PHY layer implementation that provides significant link budget improvement over conventional narrowband modulation. In addition, the enhanced robustness and selectivity provided by the spread spectrum modulation enables greater transmission distance to be obtained.

Figure 10:
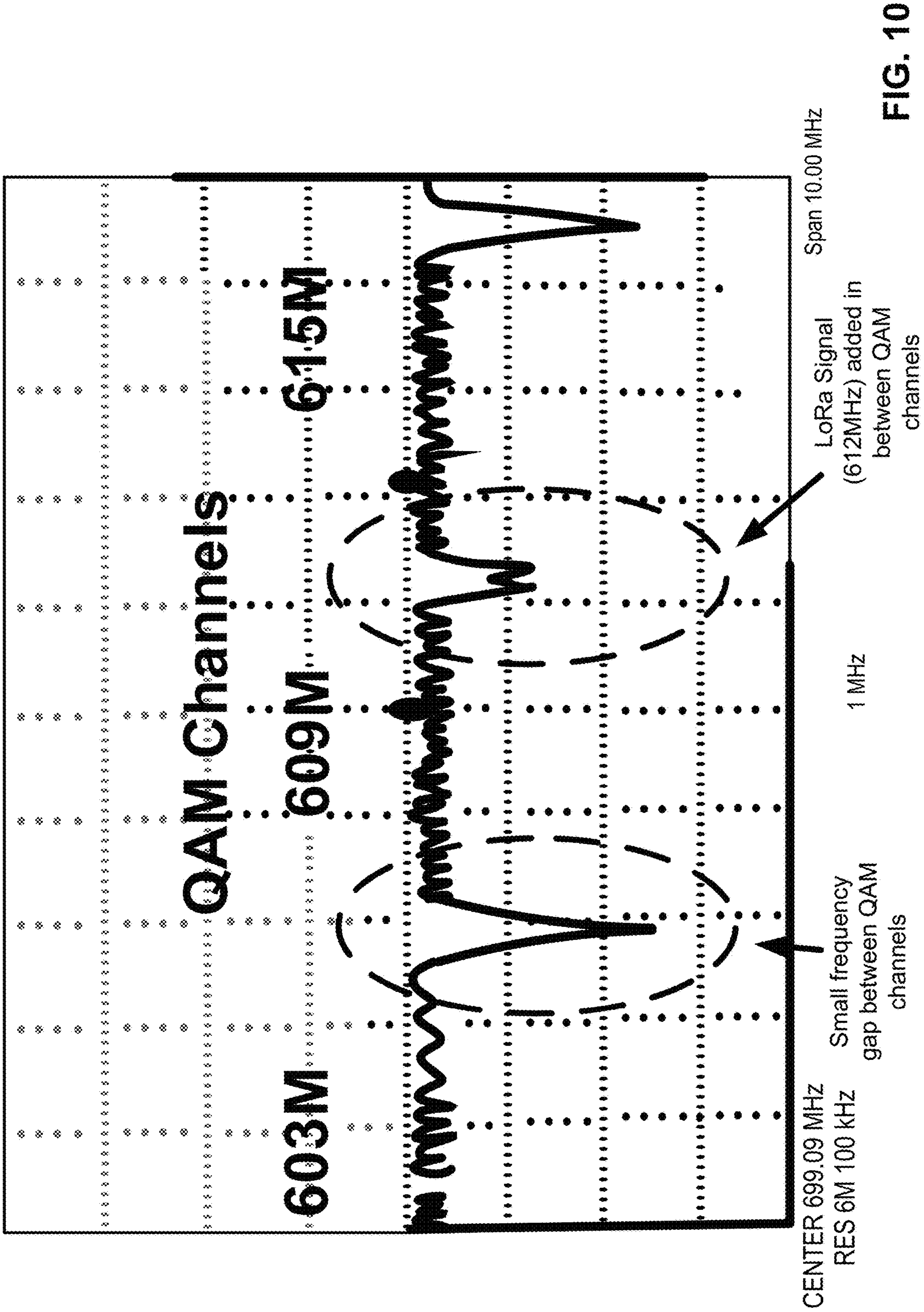
FIG. 10 is an illustration of a portion of the signal spectrum in a CATV network illustrating a location between QAM channels for inserting the spread spectrum signals for the low data rate, low power, bi-directional transmissions, consistent with embodiments of the present disclosure.

FIG. 10 shows one example of where the spread spectrum signal (e.g., a LoRa signal) might be located in frequency relative to primary signals (e.g., QAM channels in a CATV network). As shown in this example, the spread spectrum signal may be located in the relatively small frequency gap between QAM channels and the spread spectrum signal bandwidth may be adjusted to be less than 150 KHz with an amplitude about 15 dB below the QAM signal level. Thus, the spread spectrum signal (e.g., a LoRa signal) may be inserted anywhere between QAM channels (e.g., between 150 MHz to 960 MHz). For OFDM channels where there is no frequency gap, one of the channels may be turned off to insert the spread spectrum signal.

In other embodiments, the spread spectrum signals may be inserted below the lowest channels used for primary signals. In a CATV system, for example, the spread spectrum signals may be inserted below 258 MHz for downstream signals. For upstream signals in a CATV system, the spread spectrum signals may be inserted below 10 MHz, in the middle of the FM broadcast band (88 MHz to 108 MHZ) or above 204 MHz. Other locations may be possible for the spread spectrum signals relative to the primary signals to enable transmission without detectable interference.

Accordingly, low data rate, low power, bi-directional transmissions may be achieved over existing physical communication media, such as coaxial cables and optical fiber, by using spread spectrum signals, such as LoRa signals, without detectably interfering with higher bandwidth primary signals currently transmitted on the physical communication media. Such low data rate, low power transmissions may be used advantageously in HFC networks to communicate commands and/or data to and from network devices for monitoring and/or controlling the network devices.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for communication in a hybrid fiber coaxial (HFC) network including a physical communication medium coupled to a plurality of network devices, wherein the physical communication medium includes optical fiber and coaxial cables, and wherein the plurality of network devices include at least one node between the optical fiber and the coaxial cables and includes RF amplifiers coupled to the coaxial cables, wherein at least one of the RF amplifiers includes a transponder, comprising:

transmitting at least downstream primary signals over the physical communication medium to the at least one of the plurality of network devices, wherein the downstream primary signals include multiplexed narrowband modulated signals; and establishing bi-directional transmissions between the transponder in the at least one of the RF amplifiers and a gateway device, wherein establishing the bi-directional transmissions includes transmitting RF amplifier data from the transponder in the at least one of the RF amplifiers to the gateway device, wherein the bi-directional transmissions use spread-spectrum modulated signals on the physical communication medium together with the downstream primary signals, wherein the spread-spectrum modulated signals used for the bi-directional transmissions have a lower data rate and less power than the downstream primary signals and are positioned in frequency relative to the downstream primary signals such that the bi-directional transmissions occur without detectable interference with the downstream primary signals.

2. The method of claim 1, further comprising transmitting upstream primary signals over the physical communication medium from at least one of the plurality of network devices, wherein the upstream primary signals include multiplexed narrowband modulated signals, and wherein the spread-spectrum modulated signals used for the bi-directional transmissions have a lower data rate and less power than the upstream primary signals and are positioned in frequency relative to the upstream primary signals such that the bi-directional transmissions occur without detectable interference with the upstream primary signals.

3. The method of claim 2, wherein the downstream primary signals and the upstream primary signals are modulated using quadrature amplitude modulation (QAM) and multiplexed using orthogonal frequency division multiplexing (OFDM).

4. The method of claim 1, wherein the downstream primary signals are modulated using quadrature amplitude modulation (QAM).

5. The method of claim 1, wherein the downstream primary signals are multiplexed using orthogonal frequency division multiplexing (OFDM).

6. The method of claim 1, wherein the spread-spectrum modulated signals are modulated using Gaussian frequency shift keying (GFSK).

7. The method of claim 1, wherein the spread-spectrum modulated signals are chirp spread spectrum (CSS) modulated signals.

8. The method of claim 1, wherein the spread-spectrum modulated signals are generated in accordance with a LoRaWAN specification.

9. The method of claim 1, wherein the hybrid-fiber coaxial (HFC) network comprises a headend including the gateway device.

10. The method of claim 1, wherein the HFC network is a CATV network including a coaxial distribution network, and wherein the downstream primary signals include video and IP data transmitted over a CATV downstream channel spectrum to subscriber devices coupled to the coaxial distribution network.

11. The method of claim 1, wherein establishing the bi-directional transmissions includes transmitting commands from the gateway device to the transponder in the at least one of the RF amplifiers.

12. The method of claim 1, wherein the gateway device is coupled to a proactive network maintenance (PNM) system, and wherein establishing the bi-directional transmissions includes transmitting commands from the PNM system to the transponder in at least one of the amplifiers and/or transmitting data from the transponder in at least one of the amplifiers to the PNM system via the gateway device.

13. The method of claim 1, wherein the spread-spectrum modulated signals used for the bi-directional transmissions are positioned in frequency out-of-band relative to the downstream primary signals.

14. A system comprising:

a plurality of network devices in a hybrid fiber coaxial (HFC network) including at least one node between optical fiber and coaxial cables of the HFC network and RF amplifiers coupled to the coaxial cables, the plurality of network devices being configured to receive downstream primary signals, wherein at least one of the RF amplifiers includes a transponder configured to establish bi-directional transmissions using spread-spectrum modulated signals, wherein the spread-spectrum modulated signals include at least RF amplifier data transmitted from the transponder in the at least one of the RF amplifiers, wherein the downstream primary signals include multiplexed narrowband modulated signals, and wherein the spread-spectrum modulated signals used for the bi-directional transmissions have a lower data rate and less power than the downstream primary signals and are positioned in frequency relative to the downstream primary signals such that the bi-directional transmissions occur without detectable interference with the downstream primary signals;

a physical communication medium coupled to the plurality of network devices, wherein the physical communication medium includes at least the coaxial cables in the HFC network and is configured to carry the spread-spectrum modulated signals together with at least the downstream primary signals; and a gateway device coupled to the physical communication medium, wherein the gateway device includes at least one gateway transceiver configured to transmit and receive the spread-spectrum modulated signals to and from the transponder in the at least one of the RF amplifiers, and wherein the spread-spectrum modulated signals received by the gateway transceiver include the RF amplifier data transmitted by the transponder.

15. The system of claim 14, wherein the plurality of network devices are also configured to transmit upstream primary signals over the physical communication medium, wherein the upstream primary signals include multiplexed narrowband modulated signals, and wherein the spread-spectrum modulated signals used for the bi-directional transmissions have a lower data rate and less power than the upstream primary signals and are positioned in frequency relative to the upstream primary signals such that the bi-directional transmissions occur without detectable interference with the upstream primary signals.

16. The system of claim 15, wherein the downstream primary signals and the upstream primary signals are modulated using quadrature amplitude modulation (QAM) and multiplexed using orthogonal frequency division multiplexing (OFDM).

17. The system of claim 14, wherein the spread-spectrum modulated signals are modulated using Gaussian frequency shift keying (GFSK).

18. The system of claim 14, wherein the spread-spectrum modulated signals are chirp spread spectrum (CSS) modulated signals.

19. The system of claim 14, wherein the spread-spectrum modulated signals are generated in accordance with the LoRaWAN specification.

20. The system of claim 14, wherein the transponder in the at least one of the plurality of network devices and the gateway transceiver in the gateway device are configured to position the spread-spectrum modulated signals in frequency out-of-band relative to the downstream primary signals.

21. The system of claim 14, wherein the spread-spectrum modulated signals include commands transmitted from the gateway device to the transponder in the at least one of the RF amplifiers.

* * * * *